UNITED STATES PATENT OFFICE.

ARTHUR E. HANDY, OF NEW YORK, N. Y., ASSIGNOR TO OTIS ELEVATOR COMPANY, OF JERSEY CITY, NEW JERSEY, A CORPORATION OF NEW JERSEY.

SPIRAL GRAVITY-CONVEYER.

1,245,224.   Specification of Letters Patent.   Patented Nov. 6, 1917.

Application filed February 27, 1915. Serial No. 10,898.

*To all whom it may concern:*

Be it known that I, ARTHUR E. HANDY, a citizen of the United States, residing in New York, in the county of New York and State of New York, have invented a new and useful Improvement in Spiral Gravity-Conveyers, of which the following is a specification.

My invention relates to improvements in spiral gravity conveyers, more particularly adapted for use in stores, warehouses or other buildings, for conveying boxes, packages or other articles from the higher to the lower floors of a building.

More specifically the invention relates to a spiral gravity conveyer in which the articles are fed onto the conveying surface from the interior of the spiral, and the object of the invention is the provision of means for properly guiding articles from an auxiliary or feed chute on to the main conveyer, the purpose of the same being fully set forth hereinafter.

Figure 1:
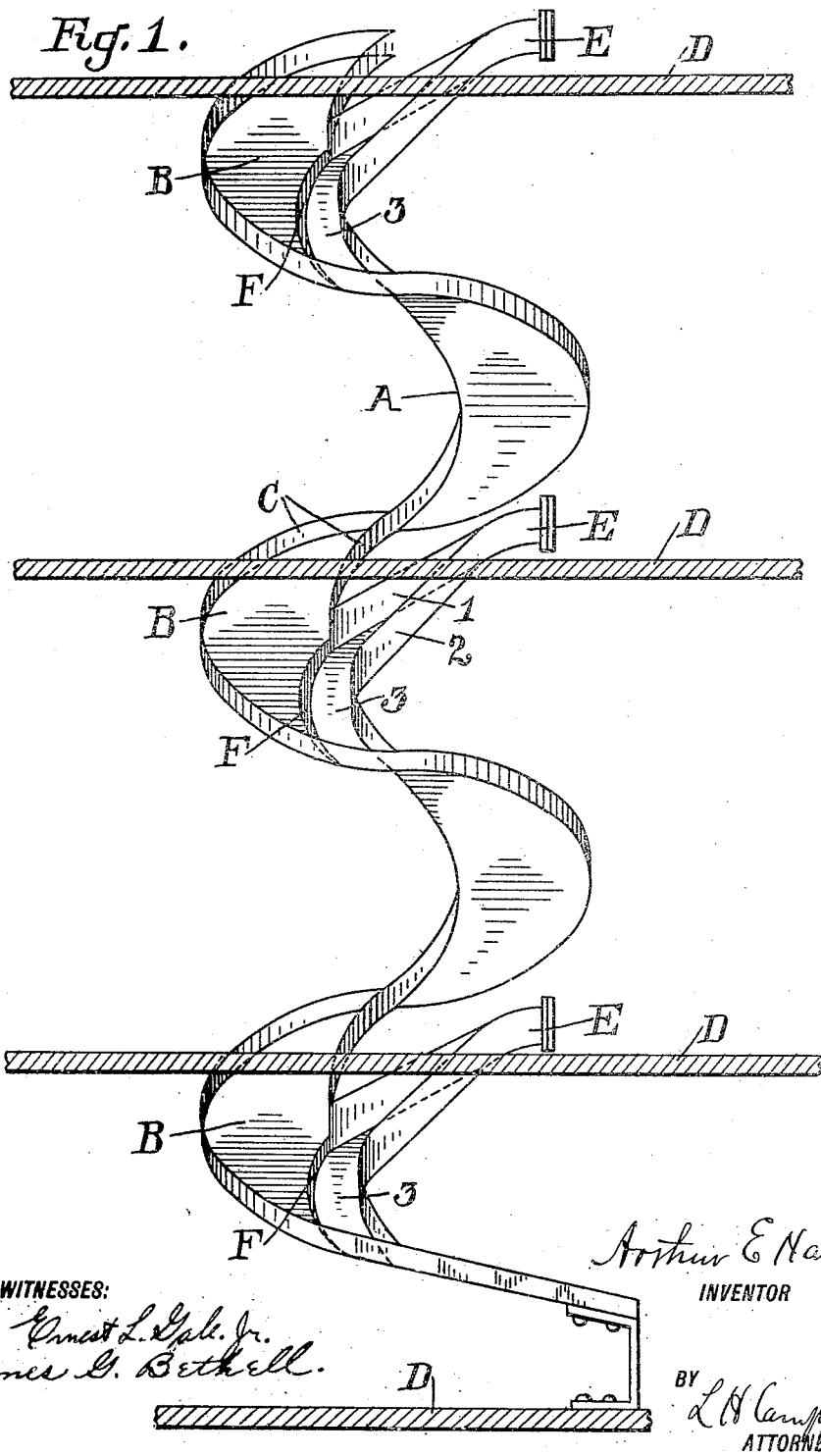
Figure 2:
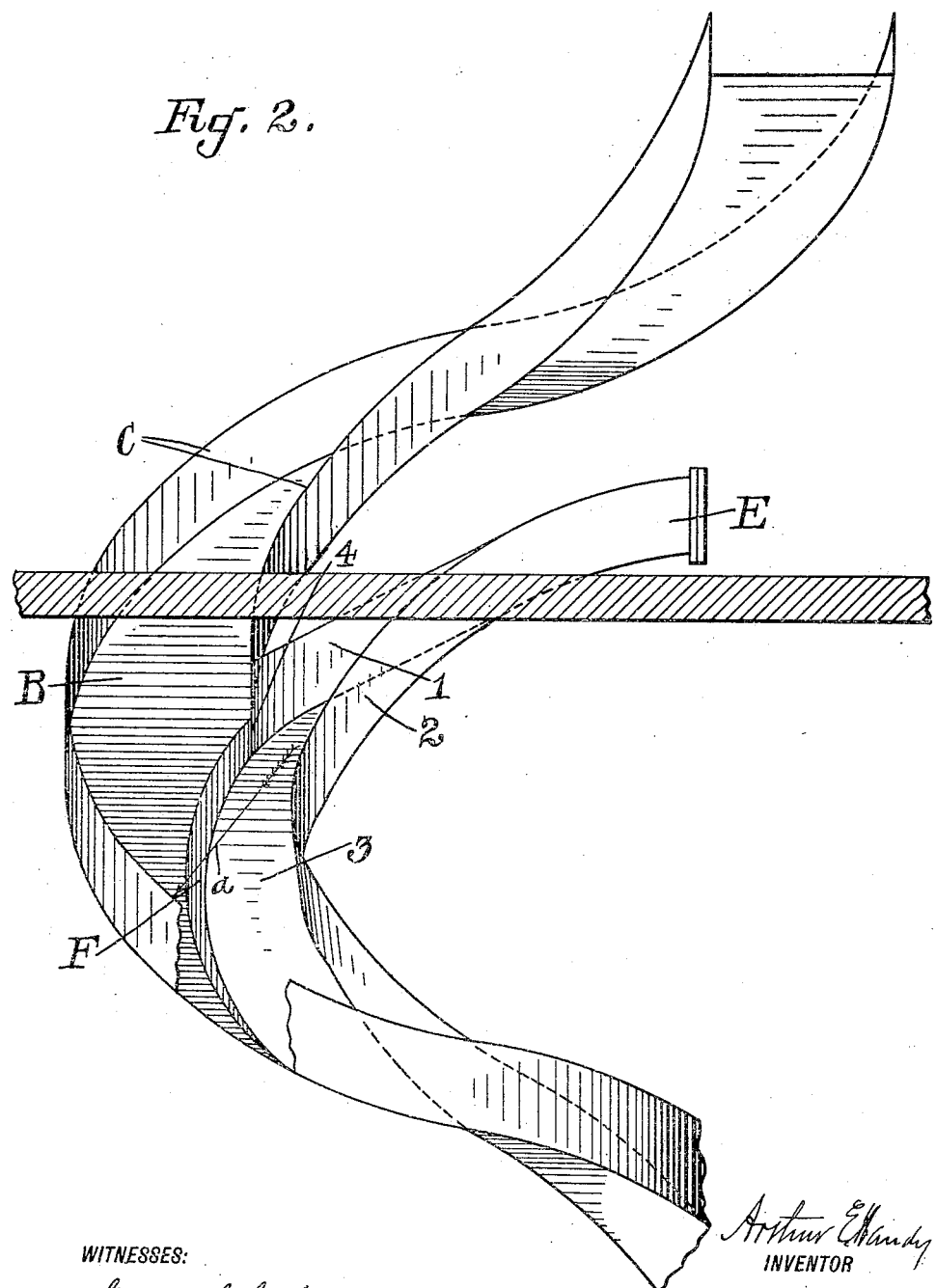

In the accompanying drawings, Figure 1, illustrates in elevation a complete spiral gravity conveyer system in accordance with the present invention, and Fig. 2 is an enlarged view of a portion of the conveyer.

The conveyer as here shown comprises a spiral trough or chute A having a horizontally disposed conveying surface B, and vertically disposed side walls or flanges C.

The drawing shows the conveyer connecting a number of floors D, of a building, it being understood that the conveyer may extend through any desired number of floors. Adjacent each floor is located a feed chute or intake E, more commonly termed an auxiliary chute, the same communicating with the main conveying surface from the interior of the spiral. This auxiliary chute comprises side walls 1 and 2, and a bottom or conveying surface 3, the latter communicating with the main conveying surface from the interior of the spiral.

Heretofore in systems of the character described, it has been found from actual practice, that the articles in their descent by gravity from the auxiliary chute into the main chute, follow a somewhat straight line path across the main conveying surface, (as indicated by the arrow "*a*"), and abut against the outer wall C of the main conveyer. Now in many instances the articles weigh as much as six or seven hundred pounds, and take box goods for example of the weight specified, it will be seen that the impact or broadside blow of such against the outer wall of the main conveyer will tend to bulge the outer wall, and in time might sever the same from the conveying or supporting structure.

This objectionable feature is a source of constant trouble, and I purpose to overcome the same in a novel and efficient manner by providing a curved step F in the main conveying surface, as clearly shown in Fig. 2, this step beginning at the terminating point 4 of the walls of the main and auxiliary spiral, and extending in a curved line or path across the conveying surface of the main spiral to the outer wall thereof. This step as will be seen, acts as a buffer and also guides the articles in a proper manner on to the main conveying surface and effectually prevents a broadside blow against the outer wall of the main conveyer.

This step is provided in the main conveying surface at each feeding point, as illustrated in Fig. 1.

Having thus described the invention and without limiting myself to the precise details as shown, what I claim as new and desire to secure by Letters Patent of the United States is:

1. In a gravity conveyer, the combination with a spiral conveying surface, an auxiliary conveying surface communicating therewith from the interior of the spiral, and a step in the spiral conveying surface for guiding objects thereon from the auxiliary conveying surface.

2. In a gravity conveyer, the combination with a spiral conveying surface, an auxiliary conveying surface communicating therewith from the interior of the spiral, and a step in the spiral conveying surface extending in a curved path across the same, for guiding objects from the auxiliary conveying surface.

3. In a gravity conveyer, a spiral conveying surface having a curved guiding step for the purpose substantially as disclosed.

4. In a gravity conveyer, a spiral conveying surface having a step extending across the same in a curved path.

In testimony whereof, I have signed my name to this specification in the presence of two subscribing witnesses.

ARTHUR E. HANDY.

Witnesses:
ERLE L. AUSTELL,
EDGAR W. SMITH.

Copies of this patent may be obtained for five cents each, by addressing the "Commissioner of Patents, Washington, D. C."